(12) United States Patent
Koyama et al.

(10) Patent No.: US 6,390,441 B2
(45) Date of Patent: May 21, 2002

(54) SOLENOID OPERATED PILOT VALVE

(75) Inventors: Katsumi Koyama; Tokumi Tsugawa; Shinji Saeki, all of Tokyo (JP)

(73) Assignee: TGK Co., Ltd., Tokyo (JP)

( * ) Notice: Subject to any disclaimer, the term of this patent is extended or adjusted under 35 U.S.C. 154(b) by 0 days.

(21) Appl. No.: 09/779,899

(22) Filed: Feb. 8, 2001

(30) Foreign Application Priority Data

Feb. 16, 2000 (JP) ......................................... 2000-037455

(51) Int. Cl.$^7$ ................................................ F16K 31/06
(52) U.S. Cl. .................................. 251/30.04; 251/30.03
(58) Field of Search ........................... 251/30.03, 30.04, 251/30.02, 30.01

(56) References Cited

U.S. PATENT DOCUMENTS

| | | | | |
|---|---|---|---|---|
| 2,705,608 A | * | 4/1955 | Phillips | 251/30.03 |
| 2,965,350 A | * | 12/1960 | Knaebel et al. | 251/30.03 |
| 3,100,103 A | * | 8/1963 | Bullard | 251/30.03 |
| 3,665,960 A | * | 5/1972 | Skinner et al. | 251/30.03 |
| 4,679,765 A | * | 7/1987 | Kramer et al. | 251/30.03 |
| 5,205,531 A | | 4/1993 | Kolchinsky | 251/30.04 |
| 5,842,679 A | | 12/1998 | Kolchinsky | 251/30.04 |
| 5,915,665 A | | 6/1999 | Paese et al. | 251/30.04 |
| 6,017,015 A | | 1/2000 | Heusser | 251/38 |
| 6,149,124 A | * | 11/2000 | Yang | 251/30.03 |

FOREIGN PATENT DOCUMENTS

| | | |
|---|---|---|
| DE | 3524728 | 1/1987 |
| EP | 0 262 382 | 4/1988 |
| EP | 0 872 674 | 10/1998 |
| JP | 11-230398 | 8/1999 |

* cited by examiner

Primary Examiner—Lesley D. Morris
Assistant Examiner—John Bastranelli
(74) Attorney, Agent, or Firm—Nilles & Nilles, S.C.

(57) ABSTRACT

In a main valve having a solenoid pilot operated valve, a movable core and a hollow plunger are movably received in a sleeve extending from a pressure control chamber through an electromagnetic coil. The plunger is structurally separated from a main valve member. A shaft is slidably received in the plunger. One end of the shaft carries a pilot valve member. A spring engages at the plunger and the shaft such that the free end of the shaft projects a predetermined length beyond an end face of the plunger. As long as the coil is deenergized, the spring separates the pilot valve member from a pilot valve seat. As soon as the coil is energized, the plunger is attracted to the core, the shaft is displaced in relation to the plunger, and the pilot valve member projecting from the lower end of the plunger closes the pilot valve seat. Due to the developing pressure difference, the main valve is closed and kept in a closed state.

12 Claims, 4 Drawing Sheets

SOLENOID OPERATED PILOT VALVE

BACKGROUND OF THE INVENTION

1. Field of the Invention

The present invention relates to a solenoid-operated pilot valve for controlling a main valve between open and closed states, and more particularly to a normally open type solenoid-operated pilot valve comprising a pilot hole formed in a main valve member which pilot hole is opened and closed by a pilot valve element magnetically coupled to a solenoid to control said main valve by pilot operation between open and closed states.

2. Discussion of the Related Art

There are two types of main valves having a solenoid-operated pilot valve (normally open type or normally closed type). With the solenoid de-energised in the first type the main valve is open, in the second case the main valve is closed. A normally open type valve is disclosed in applicant's own unexamined Japanese patent publication (KOKAI) 11-230398 (filed Feb. 20, 1998, published Aug. 27, 1999). In said valve (FIG. 7) an annular valve element facing the valve seat is secured to a main valve holding cylinder defining a main valve member. An iron core is coupled integrally to said main valve holding cylinder and is axially movably received in a sleeve for common movements with said main valve member. Along an axis of said fixed iron core said pilot hole is formed with an end opening located in said sleeve. Said pilot hole communicates with the interior of the pressure control chamber. The other end of said pilot hole is open to said low-pressure side fluid passage. At a location behind said fixed iron core at the opposite side of said main valve member a movable iron core is axially movably arranged in said sleeve. A pilot valve member is attached to an end face of said movable iron core such that said pilot valve element faces the opening of said pilot hole in said fixed iron core. Both iron cores are in mutual engagement by means of a coil spring. The freely expanded length of said coil spring keeps a predetermined distance between both iron cores without electromagnetic force acting upon the movable iron core. In the de-energised state high-pressure fluid reaches said pressure control chamber through a leak hole formed in said main valve holding cylinder. The fluid further passes to said low-pressure side fluid passage through a gap between the lower iron core and the sleeve and finally through said pilot hole. Since with said pilot valve open the fluid cannot build up considerable pressure said main valve member is pushed upwardly by the primary pressure of the introduced fluid and thus opens. In the energised state the movable iron core is attracted to the fixed iron core such that the pilot valve member closes the pilot hole. The pressure in the pressure control chamber rises due to fluid leaking in from the high-pressure side fluid passage through the leak hole. A pressure difference is built up between said pressure control chamber and the low pressure side fluid passage moving said main valve holding cylinder towards said valve seat. Said main valve element is pressed against the valve seat and remains stationary in the closed state of the main valve. If in this close state the coil is de-energised, the movable iron core inside said sleeve is pushed back under the urging force of the coil spring until both iron cores are separated by said predetermined distance. The pilot valve is opened and the pilot hole communicates with the low-pressure side fluid passage. The pressure in the pressure control chamber decreases while the pressure of the high-pressure side fluid passage acts upon the main valve holding cylinder. A pressure difference is built between the high-pressure side fluid passage and the pressure control chamber. Due to said pressure difference the main valve holding cylinder moves in a direction such that the main valve element is moved away from said valve seat and opens said main valve. If the main valve suddenly opens while simultaneously high pressure fluid is introduced to the high-pressure side fluid passage said main valve element is deformed by the pressure introduced into a gap between the main valve member and the valve element. Said valve element even may come off said main valve member. To prevent this a pressure relief hole is formed through said main valve member such that pressure introduced into said gap between said main valve member and said valve element can escape avoiding undesirable deformation of said valve element and tearing off said valve element from said main valve member.

Since said main valve holding cylinder and said fixed iron core are integrally coupled to each other and are designed to simultaneously slide within a cylindrical hole of the housing and said sleeve, respectively, there is a danger that the main valve holding cylinder and the fixed iron core get out of mutual alignment. This leads to the problem that the valve in operation cannot perform smoothly. If the fixed iron core received in said sleeve is inclined or gets out of alignment with the sleeve, a front surface of the fixed iron core facing the pilot valve element coupled to the movable iron core fails to come into close and correct contact with the pilot valve element uniformly and over the entire circumference when the pilot valve to be closed. This causes an internal leak. Fluid passing from said high-pressure side fluid passage via said leak hole, said pressure control chamber and said pilot hole in the fixed iron core reaches the low-pressure side fluid passage through the gap provided the fixed iron core and the sleeve. i.e. along the sliding portion of the fixed iron core. Foreign matter contained in the fluid enters the gap and causes a problem, because then the movable iron core does not slide properly. In order to prevent the valve element from coming off the main valve member in case of a switchover of high-pressure fluid said main valve member needs to be drilled to form a pressure relief hole. Said disadvantages lead to a deterioration in operation performance due to a misalignment of the pilot valve element and a deterioration in sliding performance due to foreign matter. Drilling a pressure relief hole is an additional costly manufacturing step.

OBJECTS AND SUMMARY OF THE INVENTION

It is a task of the invention to provide a valve as disclosed above which is fail-safe in view to misalignments of the pilot valve and in the sliding performance due to foreign matter contained in the fluid and which does not need drilling a pressure relief hole for the operational safety of the valve element.

In the valve designed according to the invention the plunger contacts the main valve member when the coil is de-energised while a position of the shaft is maintained in which the pilot valve element is separated from the pilot valve seat such that said pilot valve cannot be closed inadvertently. If fluid is entering from the high-pressure side fluid passage said fluid does not act upon the main valve member in closing direction of the main valve since the pressure control chamber is open to the low-pressure side fluid passage via said open pilot valve. The fluid instead acts upon main valve member in opening direction so that the main valve opens. As soon as the coil is energised the plunger is attracted to the movable core. By displacement of said shaft relative to said plunger said pilot valve element protrudes from the plunger and safely closes said pilot valve. The pressure in the pressure control chamber rises due to fluid leaking through from the high-pressure side fluid passage. A pressure difference is built up with the result that the main valve is moved towards the valve seat and is closed and kept in its closed state.

According to the invention said plunger is structurally separated from said main valve member. Said separation prevents a deterioration in operation performance in case of a misalignment between the plunger and said main valve member. Fluid flowing into the pilot hole from said pressure control chamber does not flow along the sliding portion of the plunger, but instead directly into the plunger and towards the pilot valve seat. This guarantees a perfect sliding performance of the plunger, since no foreign matter can deteriorate the sliding performance of the plunger.

According to a further aspect of the invention the main valve member has the pilot valve seat and said valve element attached separately from one another. Said valve element is trapped by caulking at its outer periphery and inside the recess of said main valve member. A gap is defined at the inner peripheral portion of said valve element and serves as a pressure relief passage. For that reason it is not necessary to form an additional pressure relief hole in said main valve member.

BRIEF DESCRIPTION OF THE DRAWINGS

An embodiment of the present invention is described with the help of the drawings. In the drawings is.

DESCRIPTION OF THE PREFERRED EMBODIMENTS

Figure 1:
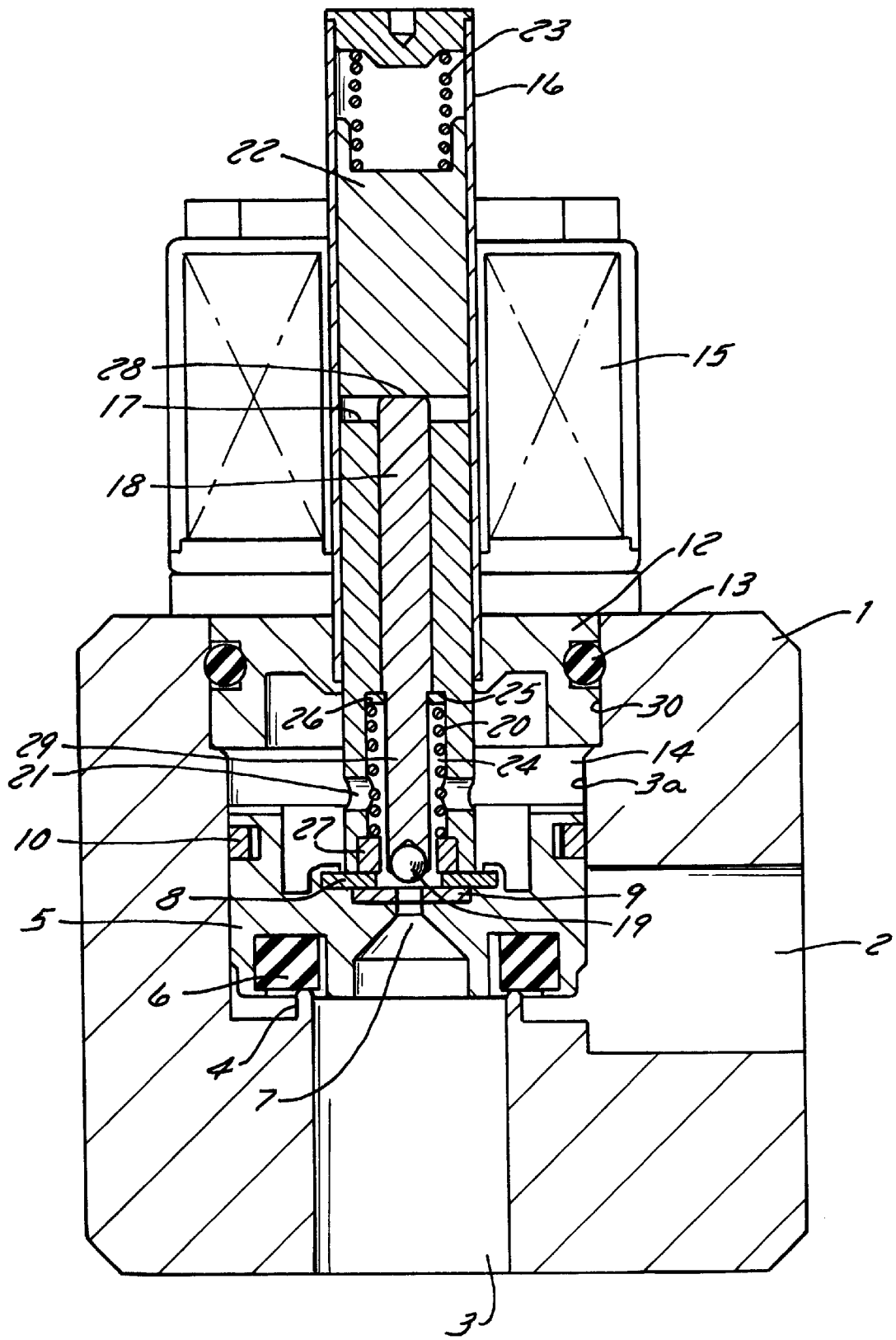
FIG. 1 a longitudinal sectional view of a normally open type main valve with a solenoid-operated pilot valve, in a de-energised state and without a pressure difference acting, FIG. 2 a longitudinal sectional view of said valve illustrating a de-energised state with a pressure difference acting, FIG. 3 a longitudinal sectional view of said valve in the moment where the solenoid-operated pilot valve has been energised with a pressure difference acting, and FIG. 4 a longitudinal sectional view of said valve with the main valve closed and the solenoid-operated pilot valve energised.

FIGS. 1 to 4 illustrate a main valve with an integrated, solenoid-operated pilot valve both having a common housing 1 with a high-pressure side fluid passage 2 and a low-pressure side fluid passage 3 communicating via a main valve seat 4 provided at the bottom of a cylindrical hole 3a formed in said housing 1 from an upper side of said housing 1 such that said cylindrical hole 3a has a widened assembling opening 30. Said valve seat 4 is formed as of a short cylinder.

Cylindrical hole 3a slidably receives a main valve member 5 the lower side of which faces towards valve seat 4. Main valve member 5 is movable in axial direction within cylindrical hole 3a. Into an annular groove formed in the front face of main valve member 5 a ring-shaped valve element 6 is fitted. Valve element 6 is trapped within said annular groove by caulking the outer periphery of said annular groove over the lower side of said ring-shaped valve element 6. Valve element 6 is designed with a dimension such that there is a clearance at its inner peripheral portion within the said annular groove as soon as said valve element is properly fitted in said annular groove. Said clearance serves as a pressure relief passage for avoiding undue deformation of ring-shaped valve element 6 and avoiding that said valve element 6 can be pressed out of said annular groove.

Along an axis of main valve member 5 a pilot hole 7 is formed. At the upper end of pilot hole 7 a pilot valve seat 9 is provided. In the embodiment shown, pilot valve seat 9 is defined by a disk having a centre bore Said disk is inserted into an upwardly open recess at the upper surface of main valve member 5 and is secured there e.g. by caulking. On top of said disk washer 8 of a larger outer diameter than the diameter of said disk is provided, having a central opening larger than the central bore of said disk 9. A ring-shaped edge region of said recess is caulked inwardly and secures said washer 8 on top of said disk. Said washer 8 has a certain thickness. In a circumferential groove cut into the outer surface of main valve member 5 a piston ring 10 is fitted. Piston ring 10 is made with slits formed at suitable circumferential intervals. Said piston ring 10 with its slits defines a leakage path between high-pressure side fluid passage 2 and a pressure control chamber 14 located above main valve member 5 in cylindrical bore 3a. Fluid from high-pressure side fluid passage 2 may flow through the slits into pressure control chamber 14. Main valve member 5 has the form of a pot with a central recessed space in the region of pilot valve seat 9 which space is part of pressure control chamber 14.

Pressure control chamber 14 and cylindrical bore 3a both are closed by a cap seated in said widened assembling opening 30 of cylindrical bore 3a and sealed by an O-ring 13. A central inner portion of cap 12 facing main valve member 5 defines part of said pressure control chamber 14.

Along the axis of cap 12 a sleeve 16 is fitted into cap 12. Sleeve 16 extends upwardly through a coil 15 provided in a solenoid housing secured to the upper side of housing 1. In the embodiment shown, sleeve 16 extends beyond said solenoid housing. In sleeve 16 a plunger 17 is received such that it can move in axial direction of the sleeve. Plunger 17 is hollow and receives a shaft 18 extending e.g. along the axis of plunger 17. A pilot valve member 19 in the form of a ball is provided at a lower end portion 29 of shaft 18. Said ball, e.g. is attached to shaft 18 by caulking. Between portion 29 of shaft 18 and plunger 17 a cavity 24 is provided in plunger 17 which opens towards main valve member. A spring 20 is received within said cavity 24. Spring 20 is interposed between a ring 26 engaging a reduced diameter shoulder 25 of shaft 18 and a ring 26 fixed to the lower end of plunger 17 in cavity 24. An upper end of cavity of 24 defines a shoulder-like abutment for ring 26. Spring 20 is a compression spring pushing shaft 18 upwardly in order to lift pilot valve member 19 from pilot valve seat 9 such that an end face 28 of shaft 18 facing upwardly projects beyond a corresponding end face of plunger 17 by a predetermined length. Further upwards in sleeve 16 a movable iron core 22 is provided which is apt to move axially. Lateral communication holes 21 are formed in the lower portion of plunger 17 establishing a communication between pressure control chamber 14 and cavity 24.

Movable core 22 received in the upper end portion of sleeve 16 permanently is urged by a spring 23 in a direction towards main valve member 5. Spring 23 is a compression spring seated on an upper closure lid of sleeve 16. Core 22, plunger 17 and shaft 18 are arranged in sleeve 16 in alignment with main valve member 5 and can be moved in axial direction by electromagnetic force generated from coil 15 surrounding sleeve 16, and/or fluid pressure related forces acting axially upon main valve member 5 to open and dose the main valve, and/or the resultant force of springs 20 and 23. The spring force of spring 20 is greater than the spring force of spring 23.

The outer diameter of main valve member 5, i.e. the inner diameter of cylindrical bore 3a, is larger than the diameter of main valve seat 4 such that the total pressure receiving area of main valve member 5 is greater than the internal pressure receiving area of valve seat 4. As long as the pressure in pressure control chamber 14 is equal to the pressure in low-pressure side fluid passage 3, the pressure in high-pressure side fluid passage 2 is acting to move main valve member 5 away from valve seat 4.

Figure 2:
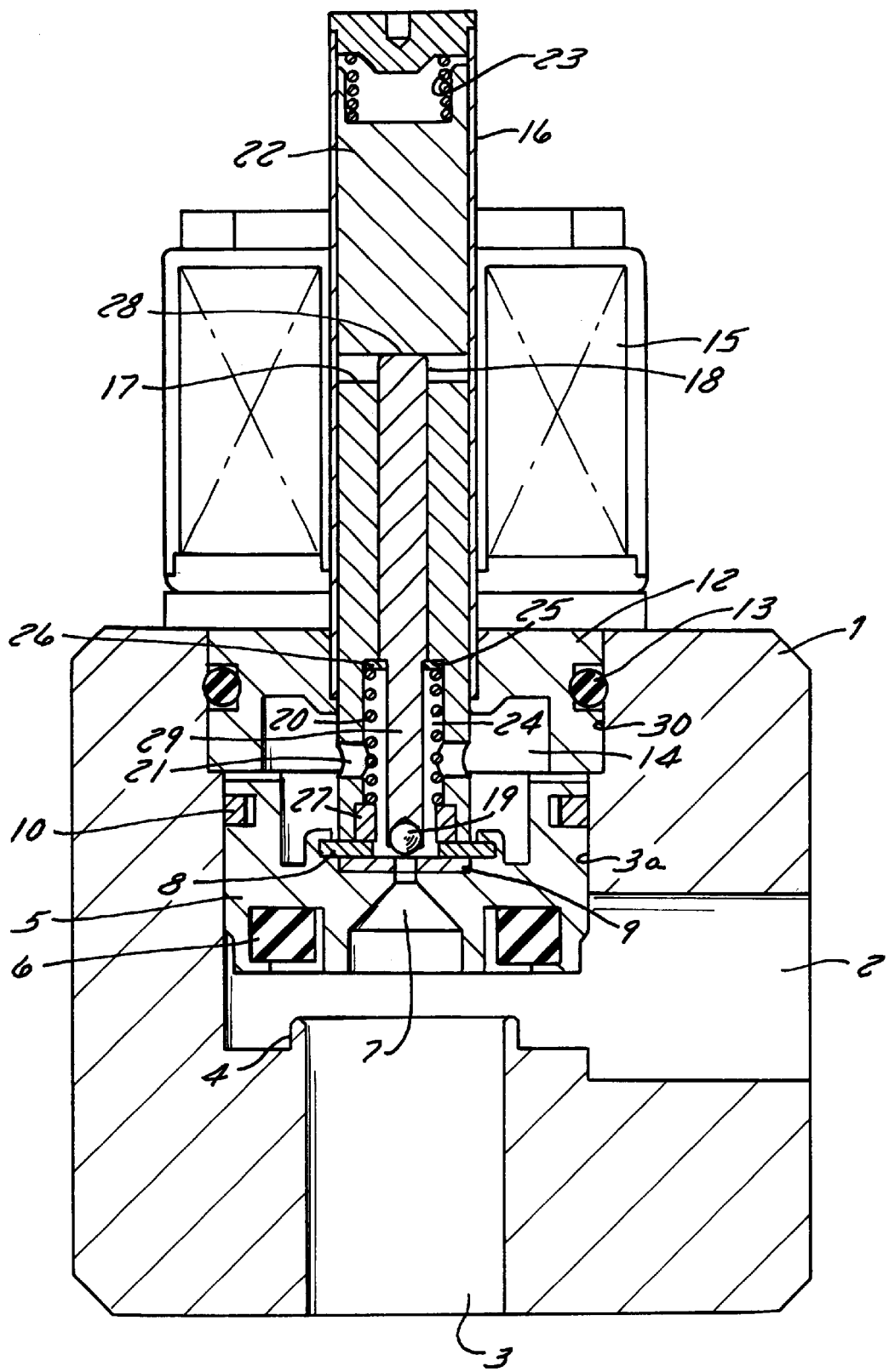
Figure 3:
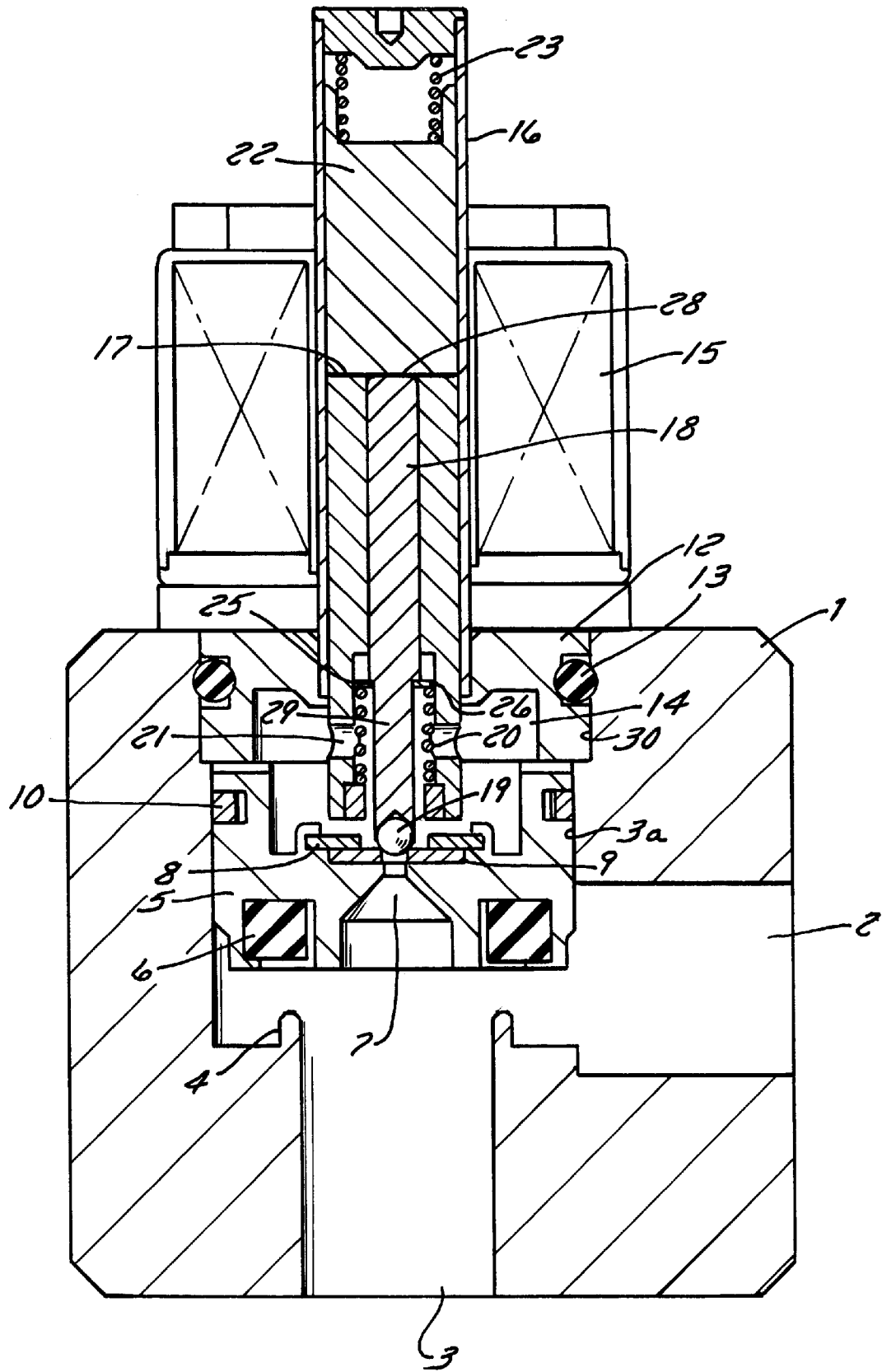
Figure 4:
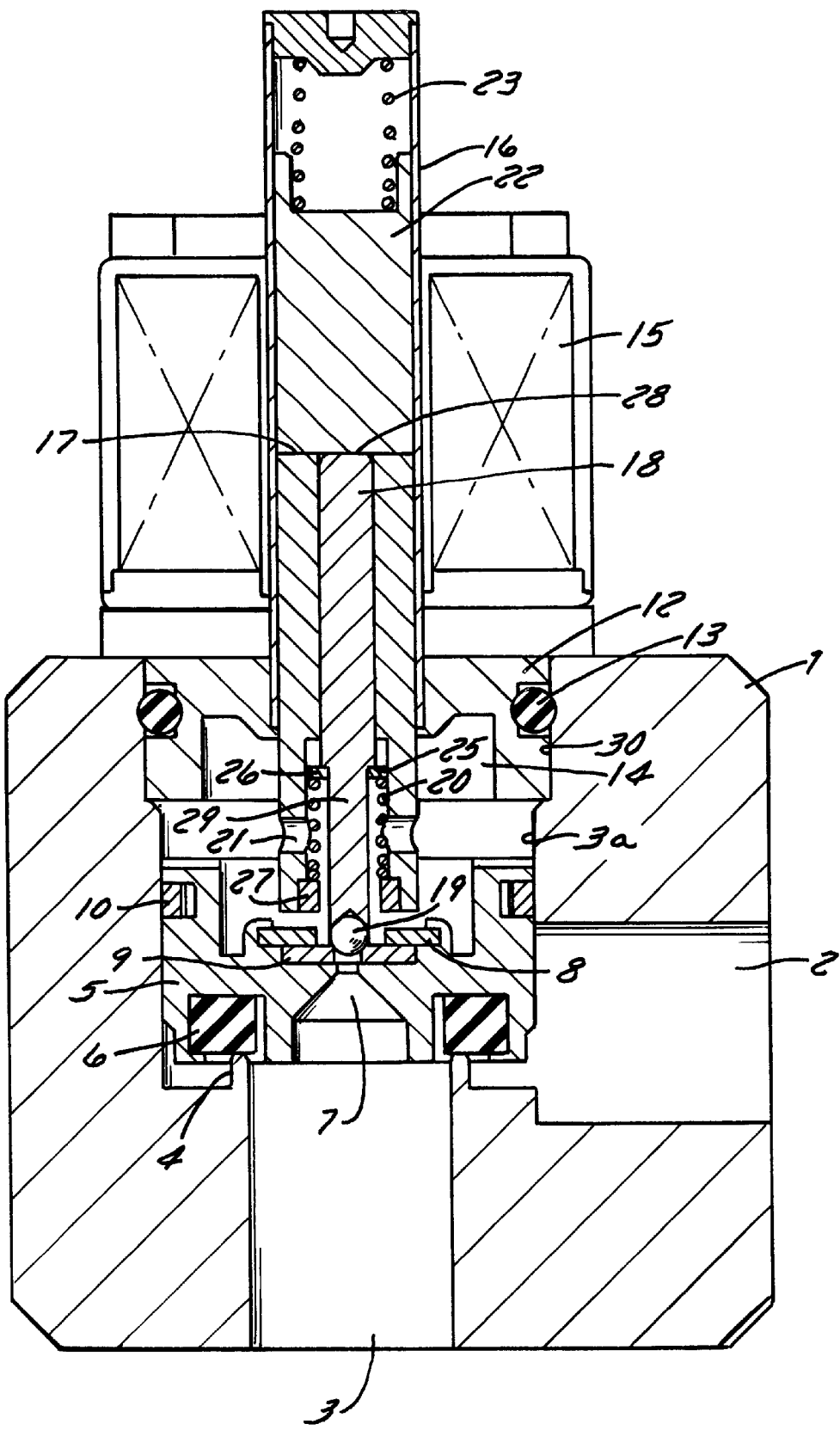

Fluid from high-pressure side fluid passage 2 can flow into low-pressure side fluid passage 3 along a fluid passage for the pilot valve defined by piston ring 10, pressure control chamber 14, communication holes 21, pilot valve seat 9 and pilot hole 7. As long as there is no pressure difference between high-pressure side fluid passage 2 and low-pressure side fluid passage 3 main valve member 5 remains in the closed position as shown in FIG. 1, due to the spring force of spring 23 without coil 15 being energised. As soon as fluid is introduced in the high-pressure side fluid passage 2 and a pressure difference is built up, main valve member 5 is moved away from valve seat 4 and main valve opens due to the pressure in the high-pressure side fluid passage 2, with coil being not energised and as shown in FIG. 2. Pilot valve member 19 remains separated from pilot valve seat 9 due to the action of-spring 20. As long as said pilot valve remains open the pressures in pressure control chamber 14 and low-pressure side fluid passage 3 are essentially equal. As soon as main valve member 5 moves away from valve seat 4, plunger 17 abutting washer 8 is pushed upwardly. Since spring 20 is stronger than spring 23, shaft 18 will move core 22 upwardly compressing spring 23. The upper distal end 28 of shaft 18 will remain projecting from upper end face of plunger 17 as shown in FIG. 2. As a consequence, said pilot valve Mill remain in its fully open state and the upper end 28 of shaft 18 will protrude beyond plunger 17 by a certain length limited by the engagement between ring 26 and said abutment at the upper end of cavity 24.

As soon as coil 15 is energised (FIG. 3) plunger 17 instantly is attracted to core 22. The magnetic force overcomes the spring force of spring 20. Lower portion 29 of shaft 18 with pilot valve member 19 is displaced downwardly in relation to plunger 17. Core 22, plunger 17 and shaft 18 are displaced downwardly by spring 23 towards main valve member 5. Pilot valve member 19 projects beyond the lower end surface of plunger 17 by a length greater than the thickness of washer 8 such that pilot valve member 19 closes pilot valve seat 9.

Now the fluid communication between pressure control chamber 14 and low-pressure side fluid passage 3 is blocked. Fluid, still leaking through piston ring 10 from high-pressure side fluid passage 2 into pressure control chamber 14 is trapped therein. Prior to a pressure balance between high-pressure side fluid passage 2 and pressure control chamber 14 and due to the spring force of spring 23 main valve member 5 starts to move towards valve seat 4 (between the positions shown in FIG. 3 and FIG. 4), together with movable core 22, plunger 17 lifted from washer 8 and shaft 18 maintaining said pilot valve in its dosed state.

Valve element 6 finally contacts valve seat 4 and closes said main valve. Said pilot valve remains in its closed state under the force of spring 23. The pressure difference between high-pressure side fluid passage 2 and low-pressure side fluid passage 3 increases and additionally holds said main valve closed.

Since plunger 17 is structurally separated from main valve member 5, any misalignment between plunger 17 and main valve member 6 does not deteriorate the operation performance. The pilot valve being a ball valve with the ball seated on the pilot valve seat 9 will be kept in close contact with, said pilot valve seat 9 even if the plunger 17 gets out of alignment. Said pilot valve, when closed, seals with enhanced quality preventing internal leakage through the pilot valve and inadvertent opening of the main valve. The structural separation of the components improves the assembling efficiency of the entire valve.

Fluid flowing from high-pressure side fluid passage 2 and further through open pilot valve does not pass along the siding portion of plunger 17 in sleeve 16. Foreign matter contained in the fluid cannot jeopardise the sliding performance of the plunger 17 in sleeve 16 and also not the sliding performance of shaft 18 in plunger 17. The pilot hole 7 formed in main valve member 5 can be made short, as shown in the drawings. A short pilot hole does not have a capillary effect. This serves to reduce the pressure loss through pilot hole and to improve the operation efficiency (insensitivity to temperature depending on fluid viscosity variations, e.g.). This also allows to employ a coil of reduced size and low power consumption. Spring 20, reliably keeping the pilot valve open in the de-energised state is provided outside of the region where the plunger 17 is co-acting with core 22. To the contrary, said spring 20 is housed in cavity 24 of plunger 17 at a location separated from the magnetic path. This allows to achieve a large magnetic path for attracting the plunger and the core 22 in turn allowing to use a small size core 22 and to actuate it with reduced power consumption.

Valve element 6 is securely attached to main valve member 5 in a manner such that at the inner peripheral portion of valve element 6 a clearance is defined. Valve element 6 is positively secured to main valve member e.g. by caulking in the region of its outer periphery. Said clearance serves as a pressure relief passage, as soon as valve element 6 is subjected to pressure. It is not necessary to provide a separate pressure relief hole in main valve member 5. This allows to reduce the manufacturing costs of the valve.

In any state of the valve the axial displacement stroke of shaft 18 between movable core 22 and pilot valve seat 9 is somewhat longer than the possible axial displacement stroke of plunger 17 between said core 22 and said washer 8. Said relationship leads to an improved operational behaviour when controlling the pilot valve.

What is claimed is:

1. A solenoid pilot operated valve, comprising a housing in which a valve seat is formed in a cylindrical housing bore, said valve seat defining a communication passage between a high-pressure side fluid passage and a low-pressure side fluid passage, a main valve member movably arranged in said cylindrical bore facing said valve seat from the side of said high-pressure side fluid passage, said high-pressure side fluid passage communicating with said low-pressure side fluid passage via a pressure control chamber provided at the rear side of said main valve member opposite to said valve seat, and a pilot hole formed in said main valve member, said pilot hole terminating at the side of said pressure control chamber at a pilot valve seat, and a pilot valve element at the side of said pressure control chamber operated by magnetic force produced by a coil to control pilot operation open and closed states of said main valve member, wherein a sleeve is arranged coaxially with said main valve member and extends from said pressure control chamber through said coil, said sleeve receives an axially moveable core, a plunger is arranged between said core and said main valve member, an axial part of which is axially movably received in said sleeve, a portion of said plunger at the side of said main valve member defines a cavity receiving said pilot valve element and communicating with said pressure control chamber through at least one communication hole, said cavity being open towards said pilot valve seat and said pilot hole formed in said main valve member, said plunger is separated from said main valve member such that it is apt to move towards said core by attraction when said coil is energised, a longitudinal shaft is moveably received in said plunger and extends through said plunger along its axis, a portion of said shaft facing towards said main valve member and having said pilot valve element is arranged so as to face said pilot valve seat attached to said main valve member, and a spring is arranged in said cavity of said plunger axially urging said shaft such that in a de-energised condition of said coil said pilot valve element is separated from said pilot valve seat and an end face of said shaft at the side of said core projects by a predetermined length beyond the adjacent end face of said plunger.

2. The solenoid pilot operated valve as in claim 1, wherein said pilot valve comprises a ball pilot valve element.

3. The solenoid pilot operated valve as in claim 1, wherein valve element is attached to said main valve member such that said valve element is caulked at an outer periphery thereof into a surface of said main valve member facing said valve seat, said surface being located opposite to a surface to which said pilot valve seat is attached.

4. A solenoid pilot operated valve comprising a housing and a cylindrical housing bore including a valve seat at a communication passage between a high-pressure fluid passage and a low-pressure fluid passage, a main valve member moveably arranged in said cylindrical bore facing said valve seat from the side of said high-pressure fluid passage, a pressure control chamber provided at the side of said main valve member opposite to said valve seat said pressure control chamber communicating with said high-pressure fluid passage via a leakage path and with said low-pressure fluid passage via a pilot hole formed in said main valve member, said pilot hole terminating at the side of said pressure control chamber at a pilot valve seat a pilot valve element at the side of said pressure control chamber operated to open and close said pilot valve seat by magnetic force produced in a moveable core by a coil to control by pilot operation open and closed states of said main valve element, wherein said pilot valve element actuable by said moveable core is arranged at a free end of a moveable shaft axially moveable in alignment with said pilot valve seat within a hollow plunger, said plunger being structurally separated from said main valve and being axially moveable received in a sleeve extending from said pressure control chamber through said coil, said plunger being loaded by a spring in axial direction towards said main valve member which spring simultaneously is loading said shaft in opening direction of said pilot valve.

5. The solenoid pilot operated valve as in claim 4, wherein said shaft carrying said pilot valve element is apt to carry out a shorter axial moving stroke between said moveable core and said pilot valve seat than an axial moving stroke which said plunger is apt to carry out between said moveable core and said main valve member.

6. The solenoid pilot operated valve as in claim 4, wherein said moveable core is loaded in an axial direction towards said plunger by a further spring the spring force of which is weaker than the spring force of said spring.

7. The solenoid pilot operated valve as in claim 4, wherein inside said cavity of said plunger said shaft is formed with an axial shoulder forming a first spring catch for one end of spring, said plunger being formed with a shoulder inside said cavity forming a second spring catch for another end of said spring, and an upper end wall of said cavity forming a second abutment for said one spring end.

8. The solenoid pilot operated valve as in claim 7, wherein a spring retainer ring is secured at said shoulder of said shaft.

9. The solenoid pilot operated valve as in claim 7, wherein said shoulder is formed by a ring inserted into a lower end portion of said plunger.

10. The solenoid pilot operated valve as in claim 4, wherein said pilot valve seat is defined by a ring body secured and centred by a caulked portion of said main valve member.

11. The solenoid pilot operated valve as in claim 4, wherein said leakage path is defined by a circumferentially slotted piston ring received in a circumferential groove of said main valve member.

12. The solenoid pilot operated valve as in claim 4, wherein said sleeve has a lower end portion secured in a cap closing a widened upper assembling opening of said axial bore, said cap simultaneously defining an end wall of said pressure control chamber.

* * * * *